United States Patent [19]

Somes

[11] Patent Number: 4,644,749
[45] Date of Patent: Feb. 24, 1987

[54] PHASE LOCKED LOOPED CONTROLLER FOR MOTORDRIVERS

[75] Inventor: Richard K. Somes, Berlin, Mass.

[73] Assignee: Sperry Corporation, New York, N.Y.

[21] Appl. No.: 476,943

[22] Filed: Mar. 21, 1983

[51] Int. Cl.⁴ ............................................. F16H 39/50
[52] U.S. Cl. ...................................... 60/459; 60/464; 60/489
[58] Field of Search ................. 60/390, 391, 329, 450, 60/452, 459, 462, 464, 489, 395, 911; 318/314, 341, 599

[56] References Cited

U.S. PATENT DOCUMENTS

| | | | |
|---|---|---|---|
| 3,176,208 | 3/1965 | Gifft | 318/314 |
| 3,530,958 | 9/1970 | Brannon et al. | 60/329 |
| 3,572,959 | 3/1971 | Shaughnessy | 60/395 X |
| 3,628,042 | 12/1971 | Jacobus | 60/395 X |
| 3,753,067 | 8/1973 | Milligan | 318/314 |
| 3,901,031 | 8/1975 | Knapp et al. | 60/395 |
| 4,103,489 | 8/1978 | Fletcher et al. | 60/452 X |
| 4,132,506 | 1/1979 | Dantlgraber | 60/452 X |
| 4,284,931 | 8/1981 | Ehret | 318/314 |
| 4,301,395 | 11/1981 | Furuhata et al. | 318/314 |
| 4,307,324 | 12/1981 | Regnier | 318/314 |
| 4,351,152 | 9/1982 | Reynolds et al. | 60/395 |

Primary Examiner—Robert E. Garrett
Assistant Examiner—John M. Husar
Attorney, Agent, or Firm—Howard P. Terry; Seymour Levine

[57] ABSTRACT

A controller for maintaining a motor operation at a desired rotational speed utilizes a phase locked loop that receives input signals from a tachometer coupled to the motor shaft. Reference frequencies for the phase locked loop are generated by a voltage control oscillator in response to voltages selected in accordance with the desired motor speed. These selected voltages are coupled to the motor speed control to establish a motor speed within the lock-in range of the phase locked loop. Tachometric feedback is applied in parallel for the phase locked loop. The open loop drive provided by the selected voltage guarantees degraded open loop control of the motor should the control circuit fall.

7 Claims, 1 Drawing Figure

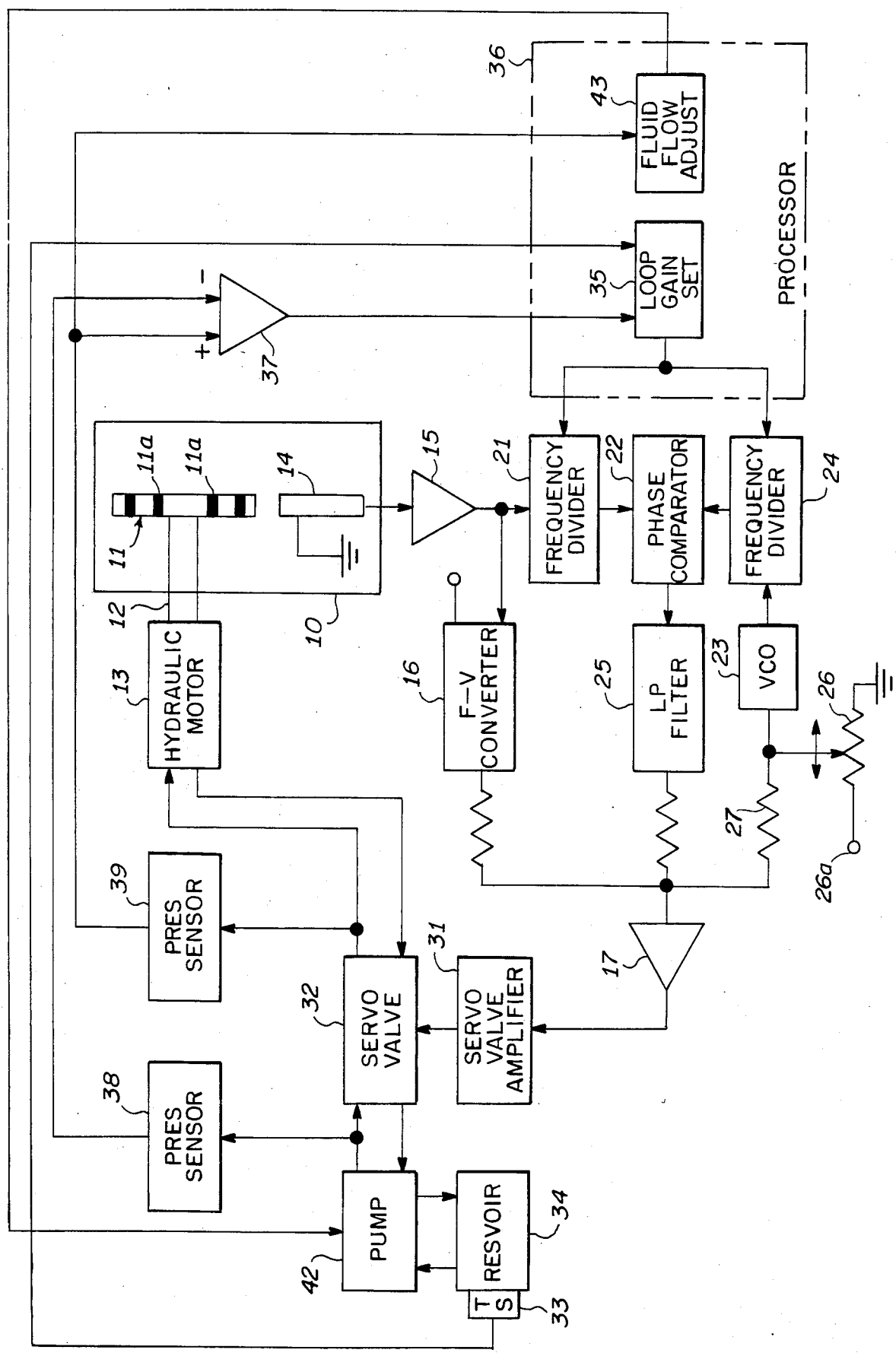

PHASE LOCKED LOOPED CONTROLLER FOR MOTORDRIVERS

BACKGROUND OF THE INVENTION

1. Field of the Invention

The present invention relates to motor speed controls and more specifically it relates to a motor speed control utilizing phase-lock loop techniques with tachometer feedback.

2. Description of the Prior Art

In many systems utilizing electric or hydraulic motors, to obtain variable speed rotary motion, feedback controls stabilize motor drive speeds that are subject to variations in loading and supply voltages or pressure. To minimize the difference between the desired speed and the actual speed of the feedback control motor drive, the open loop gain of the system must be high. Many feedback control systems integrate the loop error signal to obtain a loop control signal that produces a steady state or dc gain that approaches infinity and a loop error that approaches zero.

The practical implementation of such feedback control usually involves a tachometer, such as for example, that formed by a variable reluctance magnetic pick-up in conjunction with a gear wheel of ferrous metal, to sensor motor speed, and operational amplifiers to sum, integrate, and scale signals. The magnetic pick-up produces a signal that is approximately sinusoidal, having amplitude and frequency that are related to the motor speed. This signal, used in a conventional control loop for hydraulic motors, must be converted to a dc signal either by peak rectification or by frequency-to-dc voltage conversion, adding circuit complexity and cost, while degrading accuracy and reliability. Additionally, practical operational amplifiers used as integrators have finite dc gain, thus loop errors can not be totally eliminated. Several limitations of the conventional feedback controller may be avoided with the utilization of a phaselock loop to implement the integration function.

Systems utilizing phaselock loops for electric motor control are disclosed in U.S. Pat. Nos. 3,176,208 and 3,753,067. The error signal used for the motor control in these systems is related to the difference in phase between a reference waveform and the waveform at the output terminals of a tachometer coupled to the motor shaft. Phase locked loops in these systems act as ideal integrators, and provide a control that reduces the speed error substantially to zero.

These systems are for the control of electric motors, a task much more simple than the control of hydraulic drives. Electric motors are adequately characterized for speed and torque performance by simple linear equations and generally do not contribute significant time constants to a mechanical control loop. By contrast hydraulic drives are characterized by non-linear equations, due to the square law relationship of flow to pressure, and due to fluid compressibility almost always contribute significant time constants to the control loop. This presents special control loop stability problems that are especially troublesome in phase locked systems.

Each phase locked loop is characterized by a center frequency, a lock-in range, and a tracking range. A properly designed phase locked control must insure that the motor speed increases after starting to a speed that produces a tachometer output signal frequency within the lock-in range of the loop. Additionally, it must insure that after lock-in, transients do not cause the loop to lose lock. It is possible, in poorly designed systems, that lock will not be acquired initially or re-established after a transient disturbance.

SUMMARY OF THE INVENTION

A phase locked loop controller for motor drives in accordance with the principles of the present invention may include a variable reluctance tachometer having a ferrous gear, coupled to the output shaft of the motor, in a cooperative relationship with a variable reluctance magnetic pick up or other functionally equivalent device to provide signals representative of the motor speed. This speed representative signal and a signal at a voltage selected frequency, generated by a voltage controlled oscillator, are coupled to a phase detector wherefrom a signal that is a function of the phase difference therebetween is coupled, through a low pass filter, to an amplifier. A signal from a variable signal source is coupled to the voltage controlled oscillator to provide the frequency selecting voltage and to the amplifier. Output signals from the amplifier, which acts as a speed control signal generator, are coupled to the motor drive control thereby completing the loop.

A frequency to dc voltage converter may be coupled between the output terminals of the variable reluctance tachometer and the amplifier. This converter generates a signal that augments the speed control signal to provide rapid motor acceleration to a speed at which the tachometer generates a signal at a frequency within the lock-in range of the phaselock loop, to prevent loss of lock in the phaselock loop due to transient disturbances, and to guarantee control of the motor should the phase locked loop fail.

Gain of the phase locked loop is controlled by frequency dividers that scale the VCO and the tachometer output frequencies. This frequency scaling, for a hydraulic motor, may be controlled by a matrix memory addressed by transducers that are responsive to the fluid temperature and pressure on the hydraulic system.

BRIEF DESCRIPTION OF THE DRAWINGS

The single FIGURE is a schematic diagram of a preferred embodiment of the invention that may be employed for controlling a hydraulic motor.

DESCRIPTION OF THE PREFERRED EMBODIMENTS

A phase locked loop controller in accordance with the invention for controlling a hydraulic motor may include a magnetic or other type tachometer 10 comprising a gear wheel of ferrous metal 11 couple to the shaft 12 of the hydraulic motor 13 and a variable reluctance magnetic pickup 14. The gear 11, which rotates at a speed proportional to the speed of the hydraulic motor 13, induces magnetic variations within the variable reluctance pick-up 14 that produce a substantially sinusoidal signal, at the output terminals thereof, which has a frequency that is proportional to the rotational speed of the gear 11 and the number of teeth 11a thereon. This signal may be coupled through an amplifier 15 to a frequency-to-voltage converter 16 wherefrom a voltage representative of the tachometer 10 outputs signal frequency, and consequently of the hydraulic motor 13 speed, is coupled to the input terminal of amplifier 17. The amplified signal at the output terminal of amplifier 15 is also coupled, via frequency divider 21, to one input terminal of a phase comparator 22, the second input terminal of which may be coupled to a voltage controlled oscillator (VCO) 23, via a second frequency divider 24, to receive signals at a reference frequency. Frequency dividers 21 and 24 are controlled, in a manner subsequently to be described, to compensate for loop gain variations caused by fluid pressure changes in the system. A signal representative of the phase difference between the signals coupled to phase comparator 22 is coupled from the output terminals thereof, via a low pass filter 25, to the amplifier 17.

Signal frequencies generated by VCO 23 may be varied by a frequency control signal generated by adjusting a potentiometer 26 coupled at one terminal 26a thereof to a voltage source (not shown). This frequency control signal may also be coupled, via resistor 27, to the amplifier 17, as a reference or bias signal, whereat it is summed with the output signals from the frequency-to-voltage converter 16 and low pass filter 25. The frequency control voltage coupled to the amplifier 17, programs the motor to a speed within the lock-in range of the loop and provides open loop control should the feedback circuit fail. Signals at the output terminals of amplifier 17 may be coupled via a servo valve amplifier 31 to a servo valve 32 to control the speed of the hydraulic motor 13.

The loop arrangement above described provides speed control of the hydraulic motor 13 after start-up via the control signal from the potentiometer 26 and the voltage from the frequency-to-voltage converter 16, thus rapidly bringing the signal frequency to the output terminal of the tachometer 10 within the lock-in range of the phase locked loop comprising; phase comparator 22, VCO 23, low pass filter 25, amplifier 17, hydraulic system (including servo amplifier 31, servo valve 32, and hydraulic motor 13), and tachometer 10. After lock-in, the hydraulic motor 13 speed is controlled by the phase locked loop and maintained at a speed determined by the frequency of the VCO 23 established by the setting of the potentiometer 26. Should a transient disturbance cause the phase locked loop to break lock, the reference signal coupled via resistor 27 and signals coupled from the frequency voltage converter 16, control the speed of the hydraulic motor 13 until the system once again produces a signal, at the output terminal at tachometer 10, at a frequency within the lock-in range of the phase locked loop.

Overall loop gain is a function of the temperature of the fluid within the hydraulic system. This temperature alters the viscosity of the fluid and causes the loop gain to very inversely therewith. Since loop gain is proportional to the square root of the pressure across the valve 32, loop gain also varies with pressure changes caused by varying load demands on the hydraulic motor 13.

A loop gain above a predetermined value may cause a system to become unstable. Additionally, operation of the loop at the output signal frequency of tachometer 10, when the gear is rotating at the hydraulic motor speed, may establish a loop gain in the unstable region. Since the loop gain is a function of the operating frequency of the loop, gain control may be achieved by scaling the frequency of the VCO 23 and the output signal frequency of tachometer 10 by frequency dividers 24 and 21 respectively, the scale factors being variable, about an initial value, as a function of the fluid temperature and the pressure across the servo valve 32.

Referring again to the FIGURE. A temperature sensing transducer 33 coupled to a fluid reservoir 34 of the system provides a signal representative of the temperature of the fluid to a loop gain set circuit 35 in processor 36. Also coupled to loop gain set 35, is a signal representative of the pressure across the servo valve that is coupled from difference amplifier 37 having the noninverting and inverting input terminals thereof coupled respectively to pressure sensor transducers 38 and 39 to receive signals representative of the pressure on either side of the servo valve 32. The signals from the temperature sensing transducer 33 and the difference amplifier 37 may be used to address a matrix memory contained in the loop gain set 35 wherein signals are stored that set frequency divider 21 and 24 to a frequency scale factors which alter the loop gain in accordance with the fluid temperature and the pressure across the servo valve 32.

Load requirements on the hydraulic motor 13 alter the pressure of the fluid in the lines between the hydraulic motor 13 and the servo valve 32. This variation of pressure requires a variation of fluid flow from the pump 42, which may be accomplished by coupling the pressure representative signal from pressure sensor transducer 39 to a fluid flow adjust circuit 43 in the processor 36. In response to the signal from pressure sensor transducer 39, processor 36 couples a signal to the pump 42 that varies the stroke of the pump in accordance with the required fluid flow.

Pump and servo valve control permit a single pump to be used to drive a multiplicity of hydraulic motors. Stroke adjust signals from the fluid adjust 43 for each hydraulic motor coupled to the pump 40, cause the pump to provide a fluid flow sufficient to satisfy the greatest demand. This causes a pump pressure at the servo valve substantially equal to the pressure at the servo valve for the hydraulic motor with the greatest load. Other hydraulic motors, with smaller loads, are running at lower pressures thus establishing a greater pressure drop across the associated servo valve. The loop gain for these hydraulic motors is therefore increased and adjusted electronically, in the manner previously described to offset the higher loop gain caused by the increased pressure drop across the valve.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for controlling the speed of a motor comprising:
   motor drive means for driving said motor in response to motor drive signals coupled thereto;
   tachometer means coupled to said motor for providing a signal at a frequency representative of said motor speed;
   reference signal generating means for generating a signal at a selected reference frequency that is representative of a selected motor speed;
   first scale factor means coupled to said tachometer means for altering said frequency representative of said motor speed in accordance with scale factors determined from measured operating conditions of said motor to provide a signal at a scaled frequency representative of said motor speed;
   second scale factor means coupled to said reference signal means for altering said selected reference frequency in accordance with scale factors determined from measured operating conditions of said motor to provide a signal at a scaled selected reference frequency;

phase comparator means coupled to receive said signal at said scaled selected reference frequency and coupled to receive said signal at said scaled frequency representative of said motor speed for providing a first motor drive signal, to said motor drive means, which is representative of a phase difference between said scaled selected reference frequency and said scaled frequency representative of said motor speed; and frequency control and motor drive reference signal means coupled to said reference signal generating means for providing a frequency control signal and coupled to said motor drive means for providing a motor drive reference signal as a second motor drive signal.

2. A motor speed controller in accordance with claim 1 further including means coupled between said tachometer means and said motor drive means for providing a third motor drive signal, to said motor drive means, in accordance with said frequency representative of said motorspeed.

3. A motor speed controller in accordance with claim 1 wherein said motor is a hydraulic motor and said motor drive means includes a fluid pump and a servo valve for regulating fluid flow to said hydraulic motor.

4. A motor speed controller in accordance with claim 3 further including:

means for providing a signal representative of fluid temperature;

pressure sensor means coupled to said servo valve for providing a signal representative of a pressure difference across said servo valve; and processor means coupled to receive said signal representative of said fluid temperature and said signal representative of said pressure difference for providing scale factor signals to said first and second scale factor means, such that said selected scale factors for altering said frequency representative of said motor speed and said selected reference frequency are provided in accordance with said fluid temperature and said pressure difference across said servo valve.

5. A motor speed controller in accordance with claim 4 wherein said first scale factor means includes first frequency divider means responsive to said scale factor signals and coupled between said tachometer means and said phase comparator means for altering said frequency representative of said motor speed and said second scale factor means includes second frequency divider means responsive to said scale factor signals and coupled between said selectable frequency generator means and phase comparator means for altering said selected reference frequency.

6. A motor speed controller in accordance with claim 4 further including means coupled to said pressure sensor means and said pump for providing pump control signals in accordance with load demands on said hydraulic motor.

7. A motor speed controller in accordance with claim 5 further including means coupled between said tachometer means and said motor drive means for providing a third motor drive signal to said motor drive means in accordance with said frequency representative of said motor speed.

* * * * *